Feb. 26, 1929.

R. W. FOYLE 1,703,304

LUBRICANT COMPRESSOR

Filed April 25, 1924

Inventor
R. W. Foyle
Earl L. Pierce
atty.

Patented Feb. 26, 1929.

1,703,304

UNITED STATES PATENT OFFICE.

ROBERT W. FOYLE, OF SAN FRANCISCO, CALIFORNIA, ASSIGNOR TO ALEMITE MANUFACTURING CORPORATION, OF CHICAGO, ILLINOIS, A CORPORATION OF DELAWARE.

LUBRICANT COMPRESSOR.

Application filed April 25, 1924. Serial No. 708,933.

My invention relates to lubricant compressors particularly for use with high pressure lubricating systems employing force pumps or booster pumps fed from lubricant reservoirs. The objects of my invention are:

First, the provision of a reservoir for feeding to a high pressure force pump a continuous supply of lubricant under low pressure, such low pressure being maintained by a manual operation from time to time.

Second, the provision of a lubricant compressor comprising a low pressure reservoir having a longitudinally fixed feed screw, a piston movable substantially the entire length of the feed screw, a spring for actuating the piston and means actuated by the feed screw for periodically placing said spring under tension.

Third, the provision in a low pressure reservoir having a longitudinally fixed feed screw which extends through a piston, and spring means between the piston and a nut on said screw, of a lubricant tight seal between the screw and the piston.

Other objects of my invention are to be found from the following description of an embodiment thereof as illustrated in the accompanying drawings, wherein Figure 1 is a side elevation of my lubricant compressor.

Figure 1:
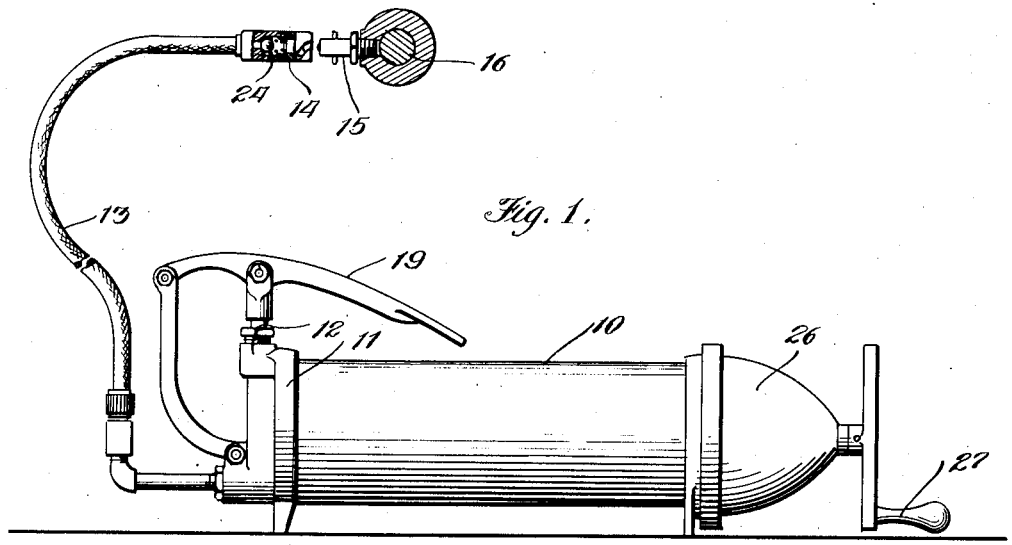
Figure 2:
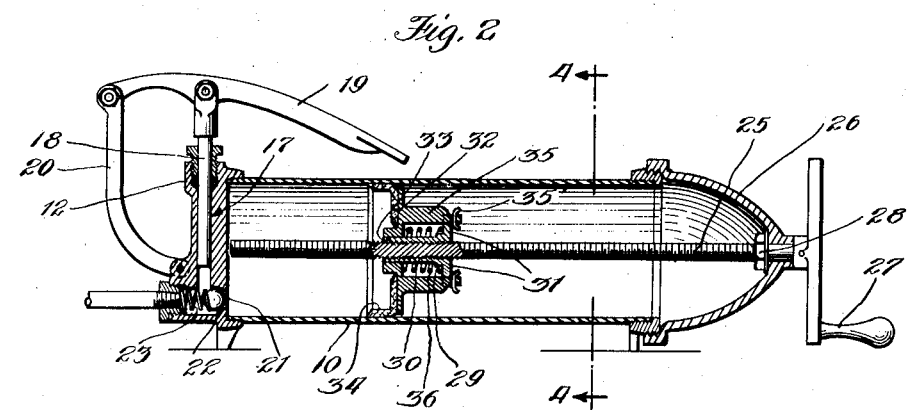
Figure 2 is a longitudinally vertical section thereof.
Figure 3:
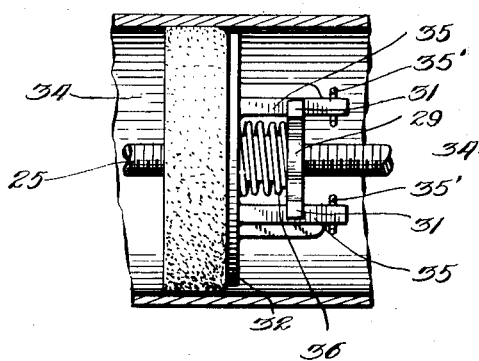
Figure 3 is an enlarged detail of the piston shown in Figure 2.
Figure 4:
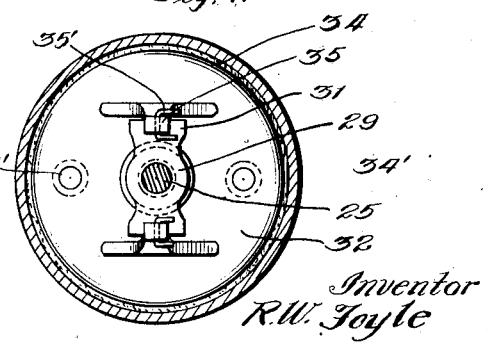
Figure 4 is a transverse vertical section taken on the line 4—4 of Figure 2.

My compressor, as shown in Figure 1, comprises in general a cylindrical reservoir 10, the forward head 11 of which carries a high pressure force pump 12 for sending lubricant through a flexible conduit 13 to a coupling 14 adapted to engage successively a plurality of nipples 15 on bearings 16 distributed about the machine to be lubricated. The pump 12 comprises a vertical bore 17 in the head 11 within which bore is slidably mounted a piston 18 actuated by a handle 19 pivoted upon a link bracket 20. At the lower end of the pump bore 17 is a passage 21 leading from the reservoir 10; the passage being normally closed by a yielding ball check-valve 22 engaged by a light spring 23.

By means of a piston later described, the lubricant in the reservoir is kept under low pressure. When the handle 19 is lifted to raise the piston 18, lubricant under low pressure is forced through the passage 21 against the force of the spring 23 to supply lubricant to the bore 17. While I have shown an inwardly seating check valve 24 in the coupling 14 to prevent the lubricant from being sucked back through the conduit rather than from the reservoir, I contemplate that the latter check valve may be dispensed with when there is a moderate pressure within the reservoir. This pressure, together with the friction of the lubricant throughout the length of the conduit, will insure the bore 17 being refilled from the reservoir.

For maintaining a continuous low pressure on the lubricant in the reservoir 10, I provide a longitudinally disposed feed screw 25 which passes through the rear closure cap 26 of the reservoir and carries a suitable hand crank 27. By means of a washer and nut 28, the feed screw is held against backward axial movement. Upon the feed screw 25 is threaded a nut 29 comprising a hub portion 30 and cross arms 31 at the rear thereof. Slidably mounted within the reservoir is a piston 32 provided with a central aperture 33 adapted to fit snugly about the periphery of the hub portion 30 of the nut to form a substantially lubricant tight seal therewith. The forward face of the piston 32 carries a suitable cup leather 34, preferably secured thereto by rivets 34'.

The piston 32 also carries a pair of diametrically opposed brackets 35 which extend rearwardly therefrom and parallel with the feed screw 25. The cross arms 31 are bifurcated at their ends to straddle the brackets 35 and prevent relative rotation of the nut and piston while permitting their relative reciprocation. The friction between the cup leather 34 and the reservoir holds the piston and nut against rotation when the feed screw is turned.

Between the piston 32 and the cross arms 31 of the nut is interposed a compression spring 36 which urges the piston forwardly to place the lubricant in the reservoir under low pressure. The brackets 35 preferably carry pins 35' to prevent the spring 36 from pushing the piston and the nut too far apart.

As the force pump 12 is actuated, small quantities of lubricant will be drawn from the reservoir 10 but the spring 36 will move the piston 32 ahead to keep the lubricant under continuous pressure. When so much lubricant has been withdrawn from the reservoir 10 that the spring 36 has moved the piston forwardly substantially the entire distance of relative reciprocation between the piston and the nut, the operator turns the feed screw handle 27 several times to advance the nut 29, again compressing the spring 36. In this manner, continuous low pressure is maintained within the reservoir 10 for feeding the force pump 19, it being necessary to turn the handle 27 only from time to time.

I also contemplate that the reservoir here shown may be used as a low pressure compressor for forcing lubricant directly to the coupling 14, the pump 12 being used as an auxiliary booster pump.

While I have shown this specific embodiment of my invention, I contemplate that certain changes may be made therein without departing from the spirit or scope of my invention.

What I claim is:

1. The combination with a force pump for lubricant, of a cylindrical lubricant reservoir communicating with said pump for feeding lubricant to the latter, a feed screw disposed longitudinally within said receptacle, means to prevent longitudinal movement of said screw, a nut on said screw having a hub portion, a piston reciprocably mounted within said reservoir and slidably mounted on said hub portion to make a lubricant tight contact therewith, a compression spring disposed about said hub portion and urging said piston toward said end, a backwardly extending bracket on said piston, means on said nut for slidably engaging said bracket for preventing rotation of said nut, and manually operable means without said reservoir for rotating said screw to advance said nut.

2. A lubricant compressor comprising a reservoir, a force pump fed therefrom, a piston slidably mounted in said reservoir, an aperture through said piston, a feed screw disposed in said reservoir and extending through said aperture, a nut threaded on said screw, said piston being slidable relatively to said nut, a compression spring interposed between said nut and said piston to push them apart, means for preventing relative rotation of said nut and said piston, a hub on said nut extending between said screw and the margin of said aperture to form a lubricant tight closure for said aperture, and means whereby said screw can be rotated to advance said nut from time to time to recompress said spring.

3. A lubricant compressor comprising a reservoir, a force pump fed therefrom, a piston slidably mounted in said reservoir, an aperture through said piston, a feed screw disposed in said reservoir and extending through said aperture, a nut threaded on said screw, said piston being slidable relatively to said nut, said nut extending between said screw and the inner margin of said aperture to form a substantially lubricant tight closure for said aperture, spring means between said nut and said piston for continuously urging said piston against the lubricant in said reservoir, means for holding said nut against rotation, and means for turning said screw to advance said nut.

4. A lubricant compressor comprising a lubricant receptacle, a piston slidably mounted therein, a hole in said piston, a feed screw disposed in said receptacle and extending through said hole, a nut engaging the threads of said screw and adapted to move relatively to said piston, spring means between said piston and said nut, means for advancing said nut by the rotation of said screw, and cooperating means on said nut and piston for preventing lubricant from passing said piston by way of said hole.

5. A lubricant compressor comprising a lubricant receptacle, a piston slidably mounted in said receptacle, a feed screw disposed within said receptacle and extending through said piston, a member engaging the threads of said screw, spring means between said member and said piston for urging said piston along said screw, and means for rotating said screw for advancing said member.

In witness whereof, I hereunto subscribe my name this 16th day of April, 1924.

ROBERT W. FOYLE.